United States Patent [19]
Surma et al.

[11] Patent Number: 5,785,923
[45] Date of Patent: Jul. 28, 1998

[54] APPARATUS FOR CONTINUOUS FEED MATERIAL MELTING

[75] Inventors: Jeffrey E. Surma, Kennewick; Joseph M. Perez, Jr., Richland, both of Wash.

[73] Assignee: Battelle Memorial Institute, Richland, Wash.

[21] Appl. No.: 612,692

[22] Filed: Mar. 8, 1996

[51] Int. Cl.⁶ .................................................. C22B 9/21
[52] U.S. Cl. ............................ 266/144; 65/335; 110/211; 266/900; 373/21; 373/22; 373/34
[58] Field of Search .................... 266/144, 159, 266/900, 901; 373/21, 22, 34; 110/210, 211; 65/335

[56] References Cited

U.S. PATENT DOCUMENTS

| | | | |
|---|---|---|---|
| 3,809,378 | 5/1974 | Iida | 266/901 |
| 4,263,468 | 4/1981 | Primke et al. | 373/22 |
| 4,740,989 | 4/1988 | Steipe et al. | 373/2 |
| 4,756,748 | 7/1988 | Lu et al. | 75/10.19 |
| 5,222,448 | 6/1993 | Morgenthaler et al. | |
| 5,280,757 | 1/1994 | Carter et al. | |
| 5,284,503 | 2/1994 | Bitler et al. | |
| 5,319,176 | 6/1994 | Alvi et al. | |
| 5,354,355 | 10/1994 | Chapman | |
| 5,370,724 | 12/1994 | Bitler et al. | |
| 5,579,705 | 12/1996 | Suzuki et al. | 75/10.19 |

OTHER PUBLICATIONS

DC Graphite Arc Furnace and Diagiostic System for Soils, JK Wittle, et al, Hazardous and Hazardous Materials, vol. 11, No. 1, 1994 Month Unavailable.

*Primary Examiner*—Melvyn Andrews
*Attorney, Agent, or Firm*—Paul W. Zimmerman

[57] ABSTRACT

The apparatus of the present invention is a melter housing having a pretreat chamber heated with a feed material heater that is partially isolated from a melter chamber. The method of the present invention has the steps of introducing feed material into a pretreat chamber and heating the feed material to a softening temperature of the feed material, and passing the pretreated feed material to a melter chamber.

7 Claims, 3 Drawing Sheets

APPARATUS FOR CONTINUOUS FEED MATERIAL MELTING

FIELD OF THE INVENTION

The present invention relates generally to an apparatus and method for increasing throughput of material through a continuous feed material melter by pretreating the incoming solids. More specifically, the invention pretreats incoming solids followed by complete melt homogenization in a joule heated melter.

BACKGROUND OF THE INVENTION

Material melting is an energy intensive process requiring high temperatures to melt solids. As described in U.S. Pat. No. 5,354,355, glass is a useful material for containing waste materials. In the method described in '355, glass forming materials are continuously preheated by combustion that takes place near or upon the cold cap covering a molten pool. The cold cap is molten material that has hardened or solidified on the surface of the melt. The cold cap is beneficial because it insulates the melt. Substantially more thermal energy would be needed to maintain a melt without a cold cap.

The molten pool is maintained in a molten state with electrodes conducting electrical energy through the molten pool. Combustion preheating generates additional exhaust gases that, for certain wastes, must be further treated before off gases may be released to atmosphere. Specific throughput or processing rate is high compared to a melter that does not use combustion preheating.

Batch preheating of a charge of material for forming glass is well known in the glass industry and has been practiced for forming glass for waste stabilization or encapsulation as shown in U.S. Pat. No. 5,222,448 issued Jun. 29, 1993 to Morgenthaler et al. for processing spent potliner from aluminum smelters, U.S. Pat. 5,280,757 issued Jan. 25, 1994 to Carter et al. for disposing municipal solid waste, and U.S. Pat. No. 5,284,503 issued Feb. 8, 1994 to Bitler et al. for remediating lead contaminated soil and battery casings. In tests performed at Battelle Pacific Northwest Laboratory in about 1983, a plasma torch was used for melt initiation, then the plasma torch was withdrawn after glass conductivity supported joule heating and electrodes used thereafter. However, this melt initiation and glass industry preheating is limited to a batch process wherein a heater (plasma torch) is used until the charge begins to soften, then electrodes are used to complete the melting and maintain a molten batch. The melt initiation and electrode batch heating are done in the same vessel in a series of steps. The specific process rate is from about 1 ton/day-m$^2$ to about 4 ton/day-m$^2$. The area used in quantifying the specific process rate is the surface area of the molten pool.

Another form of melter used to process slurries with high (up to 50 wt %) water content has been developed by the U.S. Department of Energy and demonstrated at Savannah River as reported in SAVANNAH RIVER LABORATORY'S OPERATING EXPERIENCE WITH GLASS MELTERS, FH Brown, CT Randall, MB Cosper, JP Moseley, Published in "Treatment and Handling of Radioactive Wastes", 1983, pp 184-196, Battelle Press, Columbus, Ohio. In this system, electrodes maintain a molten pool and auxiliary heat is provided above the cold cap with either a gas or electric heater. The specific process rate is increased from 0-50% compared to joule heating alone by using the auxiliary heaters in parallel with the joule heating electrodes, but at a cost of reduced thermal efficiency because of superheating the water. Further, like the combustion pre-heating, the auxiliary heaters heated over the entire area of the cold cap.

Because there is a significant amount of material containing waste to be melted into glass, and because for much of this material it is desirable to minimize offgas treatment, there is a need for a continuous melter that avoids combustion preheating and subsequent offgas treatment load yet achieves a high specific process rate.

SUMMARY OF THE INVENTION

The apparatus of the present invention is a melter housing having a pretreat chamber that is partially isolated from a melter chamber. The method of the present invention has the steps of introducing feed material into a pretreat chamber and pretreating the feed material to a homogenization ready material that is passed to a joule heated melter chamber.

The term "softening temperature" as used herein is defined as a temperature at which a physical transition occurs from a solid state wherein a material is able to resist mechanical shear stress to a flowable state wherein the material deforms under mechanical shear stress. More specifically, softening temperature is used to mean melting temperature for materials that melt, for example metals and/or salts, and as a transition temperature for materials that become flowable without a phase change, for example glass or ceramic materials.

Homogenization refers to producing a melt having substantially consistent chemical composition from a feed material that may vary greatly in its chemical composition. Homogenization requires a large volume melt that is under molten temperature for sufficient time for incoming material of variable composition to thoroughly mix within the melt so that a melt output has a substantially constant or consistent chemical composition.

It is an object of the present invention to provide an apparatus and method for continuously melting material at a high specific processing rate thereby increasing throughput of materials.

It is another object of the present invention to provide an apparatus and method for continuously melting materials that minimizes offgas and cost of energy for melting materials.

It is a further object of the present invention to provide an apparatus and method for continually melting materials, wherein a mixed feed is pretreated by removing volatile constituents separately from homogenizing nonvolatilized constituents.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1:
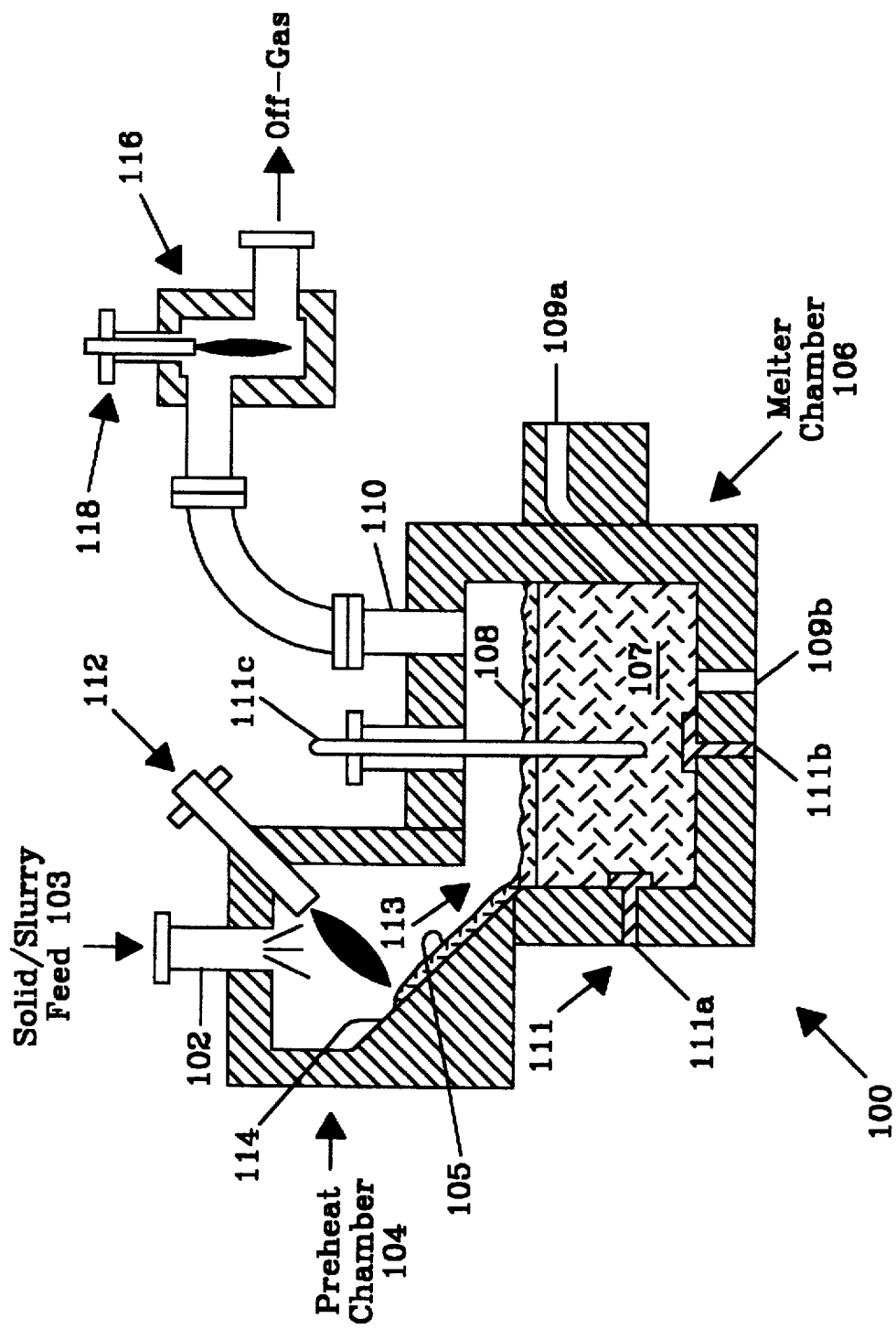
FIG. 1 is a section view schematic of the present invention with a sloped pretreat chamber.

The apparatus of the present invention is shown in FIG. 1. A melter housing 100 has a feed inlet 102 for receiving feed material 103 into a pretreat chamber 104. The melter housing 100 further has a joule heated melter chamber 106 located below the pretreat chamber 104 permitting pretreated feed material 105 to flow by gravity into the melter chamber 106 and form a molten pool 107 with a layer 108 thereon. At least one melt outlet 109a 109b is provided for removing a molten material from the molten pool 107 within the melter chamber 106. The layer 108 may be a cold cap on the molten pool 107 of molten glass, or the layer 108 may be a slag layer on the molten pool 107 of metal. Further, the molten pool 107 may be stratified between molten metal and molten glass.

The melt outlet 109a 109b is preferably a side outlet 109a or a bottom outlet 109b or a combination thereof. An offgas outlet 110 for removing any volatile material from the melter chamber is also provided. Alternatively, off-gas may be removed through the feed inlet 102.

The melter chamber 106 has at least one molten pool heater 111 to maintain the molten pool 109 in a molten state. The molten pool heater 111 may be any heater sufficient to maintain the molten pool 107 in a molten state. It is preferred that the molten pool heater 111 is either a side electrode 111a, a bottom electrode 111b, a top electrode 111c, or a combination thereof.

The pretreat chamber 104 has a feed material heater 112 mounted therein that heats the feed material 103 to a melt or softening temperature of the feed material. Heating in the pretreat chamber 104 chemically reacts certain constituents of the feed material 103. Chemical reactions include but are not limited to calcining, pyrolizing, oxidizing or a combination thereof. Volatile constituents including but not limited to water, nitrogen compounds including nitrates and nitrous oxides, carbon compounds including carbonates and carbon oxides, halogenated compounds, organics and combinations thereof are also removed from the feed material 103 during pretreatment. Pretreated feed material 105 remaining after pretreatment is non-volatilized material in either a softened or flowable state. A feature of the present invention is that by pretreating the feed material 103, the pretreated feed material 105 that enters the joule heated melter 106 is ready for homogenization. The volatilization load is removed or at least substantially reduced from the joule heated melter 106. Another feature of the present invention is that the pretreatment occurs within a pretreat chamber 104 of much smaller area than the area of the layer 108 thereby requiring substantially less heat for pretreatment.

In certain applications, it is critical to the melting operation that the pretreat chamber 104 does not volatilize any metals, but rather permits softened or melted metals to flow into the melter chamber 106. In these applications, it is preferred that the feed material heater 112 is a plasma torch rather than an electric arc thereby permitting control of the local temperature of the feed material 103. Volatilization of metal is avoided by insuring that there are little or no "hot spots" created near or within the "flame" or "element" region within the pretreat chamber 104. Such "hot spots" could result in volatilization of metal within the feed material 103 within the pretreat chamber 104. "Hot spots" within the pretreat chamber 104 are minimized or prevented by controlling the residence time of the feed material within the "flame" or "element" region to the minimum time necessary to bring the feed material to the softening temperature.

In a preferred embodiment, the pretreat chamber 104 is positioned with respect to the melter chamber 106 so that heat transfer between the feed material heater 112 and the layer 108 is insufficient to substantially heat or volatilize any portion of the layer 108. Clearly, heat is transferred from the feed material heater 112 to the layer 108 via the pretreated feed material 105. However, that heat is insufficient to substantially volatilize the layer 108 because the pretreated feed material 105 is at or near a melting temperature of the material which does not approach or exceed a volatilization temperature of the layer 108. The "flame" or "element" temperature of the feed material heater 112 generally exceeds the cold cap volatilization temperature. Accordingly, heat is available at a temperature within the pretreat chamber 104 that is capable of volatilizing the cold cap (layer 108). This heat capable of volatilization is transferred via radiation primarily, and secondarily via convection or conduction through a medium other than the pretreated feed material 105. Hence, by placing the pretreat chamber 104 away from the layer 108, the dominant mode of heat transfer from the pretreat chamber 104 to the layer 108 is by convection through the pretreated feed material 105 thereby minimizing or preventing volatilization of the layer 108.

Because the feed material is preferably substantially dry in a chunky or granular form, it is preferred that the feed material heater 112 is a convection and/or radiative heater including but not limited to combustion heater, heated coil with air, electric arc or a plasma torch. It is most preferred to use a plasma torch to minimize offgas treatment.

The pretreat chamber 104 is preferably attached to the melter chamber 106 with a constricted opening 113. The use of a constricted opening 113 permits more efficient feed material heating and reduces heat transfer between the feed material heater 112 and the layer 108. The term "constricted" as used herein means that the cross sectional area of the passage between the pretreat chamber 104 and the melter chamber 106 is smaller than the cross sectional area of the melter chamber 106, preferably smaller by at least half.

Figure 2:
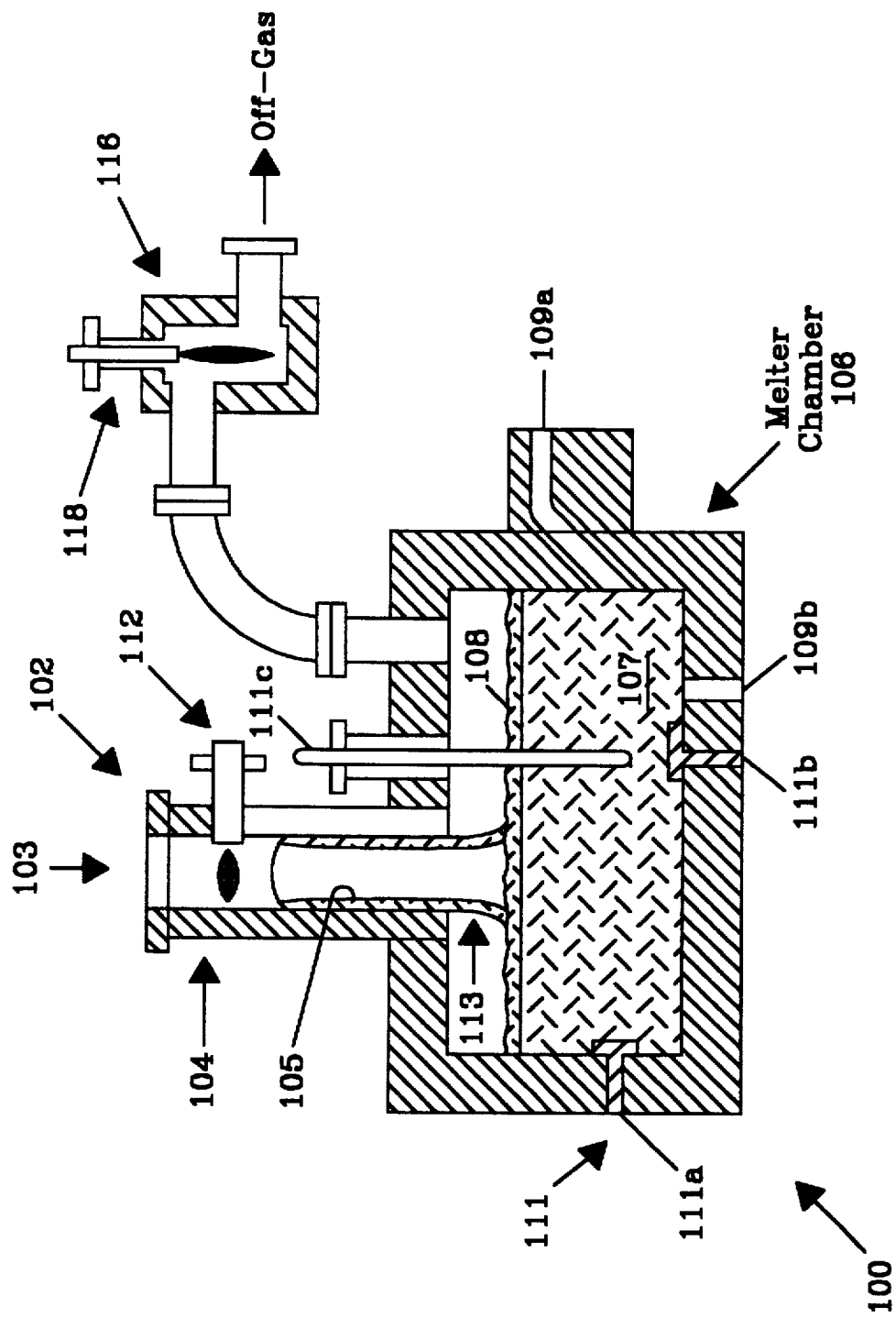
FIG. 2 is a section view schematic of the present invention with a vertical pretreat chamber.

The pretreat chamber 104 may be substantially vertical (FIG. 2) or have a sloped bottom 114 permitting the feed material to flow past the feed material heater 104 wherein the feed material 103 has a residence time sufficient to heat the feed material to a softening temperature without substantially removing volatile material from the feed material. When sloped, the slope of the sloped bottom 114 is preferably at least about 20 degrees from the horizontal and most preferably at least about 45 degrees from the horizontal.

Figure 3:
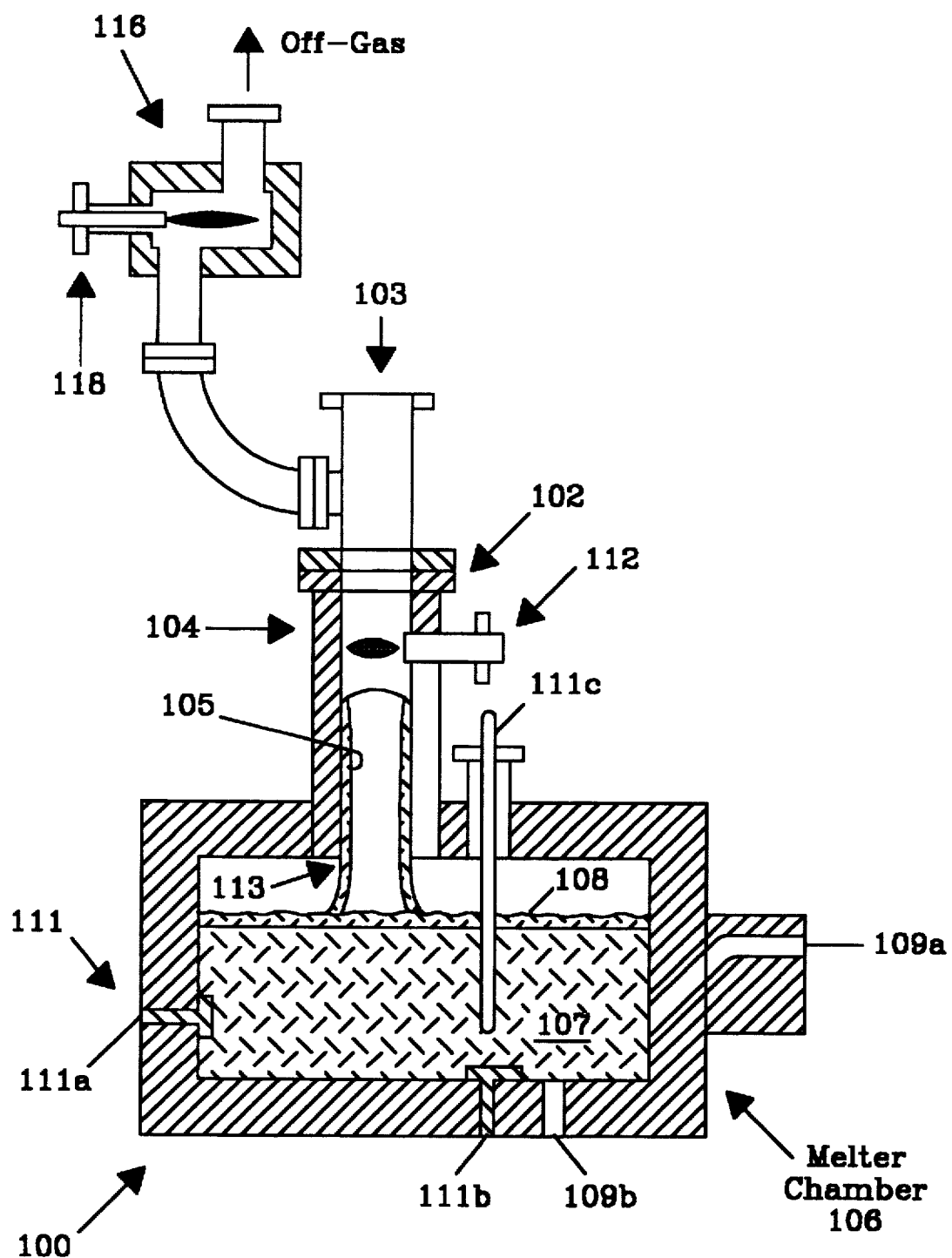
FIG. 3 is a section view schematic of the present invention with the offgas exiting through the material inlet.

The offgas outlet 110 is preferably directed to an offgas receiving chamber 116 having an offgas heater 118 for destroying the volatile material. The offgas heater 118 is preferably a plasma torch. Alternatively, offgas may be directed back through the inlet 102 as shown in FIG. 3.

In operation, feed material 103 enters the pretreat chamber 104 through a feed material inlet 102. The feed material 103 passes a material feed heater 112 that heats the feed material 103 to a molten or softening temperature, removes volatile materials and further calcines, pyrolizes and/or oxidizes constituents of the feed material 103. The pretreated feed material 105 flows to the melter chamber 106 under influence of gravity. Molten material 107 is drawn from a melt outlet 109a 109b and offgas exits via the offgas outlet 110. Offgas is preferably directed to a secondary plasma chamber 116 having an offgas heater 118 for destroying volatiles.

In combination, the feed material heater 112 and the joule heated melter chamber 106 permits a specific processing rate of feed material 103 of at least 2 times greater that the specific processing rate of feed material possible with either the plasma torch material feed heater 112 or electrode melt heaters 111 alone. In addition, offgas treatment is minimized by (1) selecting a feed material heater that adds minimal gas or other material into the process. Offgas treatment is further minimized in certain applications by avoiding heating the feed material 103, 105 or the molten pool 107 or the layer 108 to a temperature that would volatilize metals.

The increased specific processing rate is possible because the invention makes use of two heating methods at their most efficient operating parameters and avoids operating them under less efficient conditions. Specifically, a joule heated melter relies upon electrical continuity between electrodes. When solids or granules are present between electrodes, there is less electrical continuity and conductivity than when a molten pool 107 is present between the electrodes 111a, 111b, 111c. Hence, maintaining a molten pool 107 between electrodes permits operation of the melter at maximum efficiency. Further, the invention permits operation of the joule heated melter 106 solely for the purpose of homogenizing the molten pool 107 by performing removal of volatiles prior to homogenization thereby increasing the efficiency of the homogenization.

The feed material heater 112 that heats by convection and/or radiation benefits from a high surface area to volume ratio of the material to be heated. Solid, granular material and even a slurry is more efficiently heated by a convection and/or radiation heater than a contiguous mass of solid or molten material because the solid granular material has spaces between particles where the convection gas or radiant energy can enter and effect heating. And a slurry can boil permitting convection heating. Accordingly, using a convection and/or radiation heater solely for heating, removal of volatiles, calcining, pyrolysis, and oxidation of solid granular material or slurry material permits operation of the feed material heater 112 at maximum efficiency.

Offgas treatment is minimized by minimizing addition of combustion gases through selection of the feed material heater 112. In certain applications, the volatilization is minimized by avoiding or preventing volatilization of metals."hot spots" upon the material anywhere within the melter housing 100. Because the feed material heater 112 may generate a hot spot if located near the layer 108, it is located with respect to the melter chamber 106 so that heat transfer between the feed material heater 112 and the layer 108 is insufficient to volatilize the layer 108 as previously stated. Offgas treatment is further minimized by preferably using a plasma torch as a feed material heater 112. A plasma torch generates very little exhaust. The plasma torch may be either a transferred plasma torch or a transferred arc plasma torch.

In situations wherein the layer 108 is specifically a cold cap, the cold cap insulates the molten pool 107 thereby conserving thermal energy. As pretreated material enters the melter chamber 106, it flows and distributes itself over the cold cap and becomes part of the cold cap. The underside of the cold cap in contact with the molten pool 107 erodes or diffuses into the molten pool 107 thereby maintaining an equilibrium thickness of the cold cap. The equilibrium thickness of the cold cap may be controlled by the amount of energy put through the electrodes 111 and by the amount of energy added in the pretreat chamber 104. The temperature of the cold cap is preferably maintained between from about 500° C. to about 700° C. The thickness of the cold cap may range from about 0.6 cm (0.25 inch) to about 15 cm (6 inches) and is preferably between from about 2.5 cm (1 inch) to about 5 cm (2 inches).

Materials that may be melted by the present invention include metals, ceramics, glasses or combinations thereof. Preferred materials are glasses and glass forming solids with minor amounts of metals.

Closure

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. An apparatus for continuously melting materials, comprising:

(a) a melter housing having a feed inlet for receiving feed material into a pretreat chamber having a bottom sloped at least 20 degrees from horizontal, said pretreat chamber having a plasma feed material heater;

(b) a joule heated melter having a at least two joule heating electrodes, said joule heated melter located below said pretreat chamber permitting pretreated feed material to flow by gravity into said joule heated melter wherein a molten pool is to be formed, said joule heated melter further having at least one melt outlet for removing a molten material from said joule heated melter; and (c) an offgas outlet for removing any volatilized constituent.

2. The apparatus as recited in claim 1, wherein said pretreat chamber is positioned with respect to said melter chamber in a manner that any heat transferred between said feed material heater and a cold cap is insufficient to substantially volatilize any portion of said cold cap.

3. The apparatus as recited in claim 1, wherein said pretreat chamber is attached to said melter chamber via a constricted opening.

4. The apparatus as recited in claim 1, wherein said sloped bottom is sloped at least 45 degrees from horizontal.

5. The apparatus as recited in claim 3, wherein said constricted opening is substantially vertical.

6. The apparatus as recited in claim 1, further comprising an offgas receiving chamber having an offgas heater for destroying said volatilized material.

7. The apparatus as recited in claim 6, wherein said offgas heater is a plasma torch.

* * * * *